Aug. 30, 1960 — R. M. SUGARMAN — 2,951,181
SAMPLING OSCILLOSCOPE
Filed Nov. 25, 1958 — 6 Sheets-Sheet 1

INVENTOR.
ROBERT M. SUGARMAN

INVENTOR.
ROBERT M. SUGARMAN

INVENTOR
ROBERT M. SUGARMAN

ATTORNEY

United States Patent Office 2,951,181
Patented Aug. 30, 1960

2,951,181

SAMPLING OSCILLOSCOPE

Robert M. Sugarman, East Patchogue, N.Y., assignor to the United States of America as represented by the United States Atomic Energy Commission Filed Nov. 25, 1958, Ser. No. 776,394

12 Claims. (Cl. 315—24)

This invention relates to oscilloscopes for presenting a display of information concerning transient signal waveforms, and more particularly it relates to a sampling oscilloscope for presenting a display of information concerning transient signal waveforms having random time and amplitude distributions.

Many millimicrosecond pulse techniques (see, e.g., "Millimicrosecond Pulse Techniques" by I. A. D. Lewis and F. H. Wells, McGraw Hill Book Co., Inc., 1954) require an oscilloscope capable of presenting a display of information concerning a transient signal waveform having less than $10^{-9}$ seconds rise time and an amplitude of only a few millivolts. Typical applications for such an oscilloscope occur in the testing of photomultipliers, diodes and transistors at low output signal levels. An oscilloscope of this kind does not exist, i.e., one capable of displaying a transient signal waveform having the aforesaid characteristics. By the practice of this invention, however, this result is accomplished by taking samples of information from repetitions of the unamplified waveform, then amplifying the individual samples, and finally stretching them in time and displaying them on an ordinary low-frequency cathode ray tube or pen chart recorder as a composite picture of the waveform itself. More particularly, this is accomplished by taking one instantaneous amplitude sample pulse height from each sequential signal waveform at an increasingly greater time interval with respect to the start thereof for each later sampled waveform. The sample pulse heights are displayed in the usual fashion on a cathode ray tube whose vertical deflection is proportional to the particular pulse height at a given sampling time and whose horizontal deflection is proportional to the sampling time interval from the start of the waveform sampled.

The sampling oscilloscope of this invention also incorporates a pulse height analyzer or channel circuit to select for display only those sample pulse heights from input signal waveforms whose amplitudes fall within a predetermined amplitude distribution, and further a variable voltage level shifter for establishing together with a time scale sawtooth or ramp voltage generator the time for taking the sample pulse height relative to the start of the waveform. The voltage level shifter provides a voltage whose level is increased for each sequential waveform sampled. In the practice of the invention, it has been found that a slowly rising ramp voltage 21, as illustrated, may be used for this purpose rather than the staircase voltage described.

It is an object of this invention to provide method and apparatus for displaying information concerning transient signal waveforms having a fast rise and fall time.

It is another object of this invention to provide a sampling oscilloscope for presenting display of information concerning transient signal waveforms having random time and amplitude distributions.

It is another object of this invention to provide a sampling oscilloscope which has minimal amplitude dispersion and minimal time dispersion caused by the amplitude dispersion in the display of information concerning transient signal waveforms by incorporating therein a pulse height analyzer.

It is another object of this invention to provide a sampling oscilloscope in which time dispersion caused by amplitude uncertainty is minimized by using wide-band trigger circuits that fire on the leading edge of the signal waveform.

It is another object of this invention to provide a sampling oscilloscope which is self-triggered by signal input waveforms to allow presentation of a display of information concerning signal waveforms occurring at random times.

It is another object of this invention to provide a sampling oscilloscope having improved frequency response by employing a single microwave crystal diode as a strobe element.

It is another object of this invention to provide a sampling oscilloscope in which there is limited interaction between the stroke circuitry and the source of signal waveforms.

It is another object of this invention to provide a sampling oscilloscope in which the sampling strobe impulse width is narrowed by employing a cathode biased microwave crystal diode.

It is another object of this invention to provide a sampling oscilloscope with a several-fold increase in the useful sensitivity at low signal impedance levels.

It is another object of this invention to provide a sampling oscilloscope in which a step advance in time sampling is synchronized with the arrival of each input signal waveform to allow the number of sample pulse heights and the time axis spacing between sample pulse heights to be independent of the time axis spacing between sequentially sampled input signal waveforms.

The foregoing objects as well as other objects and advantages of this invention will be understood through consideration of the following discussion taken together with the drawings in which.

Figure 1:
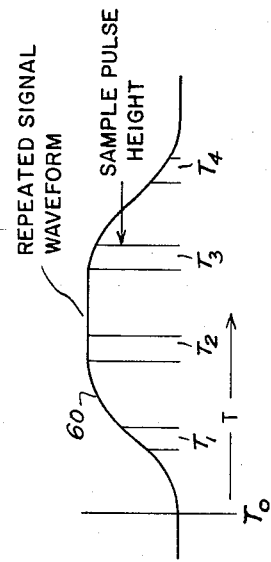
Figure 1 illustrates a typical repeated input signal waveform of the type to be displayed showing sample pulse heights taken at successive time intervals from its start.

In the study of a physical process, information concerning its nature is often obtained as an electric voltage waveform, and it is often desirable that visual presentation or photographic record be made of the waveform. A cathode ray tube in which an electron beam traces a pattern on a luminescent screen is a convenient means for displaying the waveform. The particular location of the electron beam on the screen at any instant is determined by the voltages applied to two electron beam deflection systems which establish two orthogonal intersecting axes. The intersection of the axes fixes the location of the electron beam on the screen. A cathode ray oscilloscope is a device incorporating a cathode ray tube to display on the cathode ray tube screen a trace of the electron beam representative of a portion of the oscilloscope input signal waveform. Information concerning several sequential waveforms may be displayed on the tube screen either by the electron beam tracing the same portion of each waveform or by it tracing a different portion therefrom.

A conventional oscilloscope such as described in the Gernsback Library, Inc. 1958 book, "Oscilloscope Techniques" by Alfred Haas is designed to permit intelligible display of information concerning a waveform whose duration at the input to the oscilloscope is relatively long. A waveform is said to have a long duration if it can be amplified by conventional electron circuitry (illustratively, having a minimum duration of $10^{-8}$ seconds) by tracing the same portion of successive waveforms. A sampling oscilloscope such as described in the article by J. G. McQueen in the journal, "Electronic Engineering," volume 24, page 436, 1952, is designed to permit intelligible display of information concerning repetitive waveforms having substantially identical amplitudes and time spacings whose duration at the input to the sampling oscilloscope is relatively short.

Waveforms are often generated in such technical fields as nuclear research, transistor technology and high-speed computers to have random amplitudes and random time spacings. The aforesaid conventional oscilloscopes either respond too slowly to the waveforms to display intelligible information concerning them or introduce amplitude dispersion and time dispersion into the waveforms which precludes intelligible display of information concerning them. Amplitude dispersion is the smearing of the display pattern in a conventional oscilloscope due to changing or non-uniform signal amplitudes and, in a sampling oscilloscope, due to changing or non-uniform sample pulse heights at any particular sampling time interval after waveform start. Time dispersion results in blurring of the electron trace on the cathode ray tube screen and is caused by uncertainty in the determination of the time of the start of a signal which is caused in turn by the amplitude dispersion of the signal waveform.

A sampling oscilloscope has several inherent advantages over a conventional oscilloscope among which are:

(1) Since a sampling oscilloscope does not have to display each signal waveform, but only a single voltage level from that signal waveform representing the height of the waveform at a given instant in time, the bandpass of its amplifiers and cathode ray tube need only be sufficient to recover in the time between signals.

(2) Since each voltage level or sample pulse height need not be displayed until shortly before the next signal waveform is sampled, there is ample time for circuitry to decide whether or not to take the sample. For example, in the present sampling oscilloscope, a pulse height analyzer or channel permits display of sample pulse heights of input signal waveforms which fall within a predetermined amplitude distribution. Circuitry in a conventional oscilloscope would have to make this decision before triggering its sweep. The resulting time to make the decision would then need to be compensated for by a signal delay line having this time length. The very high bandpass of such an oscilloscope also necessitates a bulky and expensive delay line. Since the volume of the type of delay line required increases as the cube of its length, such an added delay line would be prohibitively expensive. The alternative would be an extremely fast channel selector and associated amplifier which are quite difficult to construct.

A sampling oscilloscope in accordance with this invention presents an unsmeared record of input signal waveforms which have random amplitudes and time spacings. Samples of information are taken from sequential signals in a train of signals. The individual samples are stretched, amplified and displayed on a cathode ray tube screen. The horizontal deflection of the electron beam is determined by the voltage level established by a variable voltage shifter at the time the sample pulse height is taken of a signal waveform. Since the ratio of the horizontal position on the waveform to the time at which the sample pulse height is taken is constant, the electron beam traces on the tube screen at a constant velocity an accurate record of the average waveform of the sampled input signal waveform.

Each input signal waveform triggers a ramp generator which initiates a ramp voltage time scale at some fixed time delay relative to the start of the waveform. The time delay is determined by pulse height and rise time of each input signal waveform. A variable voltage shifter produces a variable voltage such as a slowly rising ramp voltage or a staircase voltage whose voltage level is raised one step at a time for each sequential signal waveform to be sampled.

Figure 2:
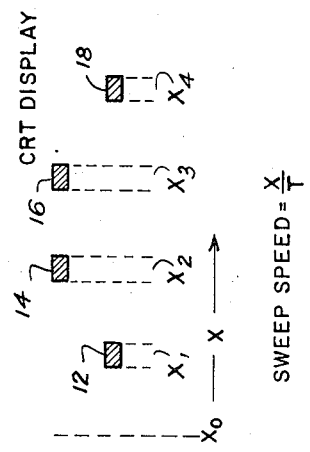
Figure 2 illustrates a cathode ray tube display of sample pulse heights taken at increasingly greater time intervals from the start of sequential input signal waveforms.
Figure 3:
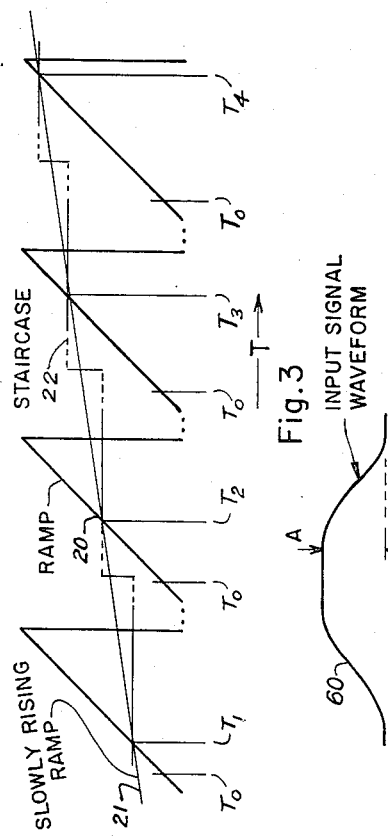
Figure 3 illustrates how sampling time intervals are established when a ramp voltage and a variable voltage are at the same voltage levels.

This invention will be more readily understood by reference to the following description of the drawings. Figures 1, 2 and 3 illustrate, respectively, a repeated signal waveform 60; a cathode ray tube display of sample pulse heights 12, 14, 16 and 18 taken at different points along sequential signal waveforms 60; and a ramp voltage 20 and a variable voltage, a slowly rising ramp 21 or a staircase 22 for establishing the sample taking time relative to the start of each signal waveform 60. Four sequential signal waveforms 60 are amplitude sampled at successive times $T_1$, $T_2$, $T_3$ and $T_4$, respectively, from the initial trigger time $T_0$ thereof at distances along the waveform $X_1$, $X_2$, $X_3$ and $X_4$, respectively, from the starting point $X_0$ of each waveform 60 to obtain the display on the cathode ray tube shown in Figure 2. By horizontal sweeping on the cathode ray tube of the sample pulse heights 12, 14, 16 and 18 obtained from sequential wave forms 60 in this fashion, there is presented a display thereof representative of the average signal waveform. The signal waveform 60 itself is used to establish the initial trigger time $T_0$ through circuitry responsive to its initial rate of rise as will be later described. The ramp voltage 20 is a fast rising sawtooth initiated at initial trigger time $T_0$ with a duration at least that of the longest signal waveform of interest. Illustratively, the ramp height is 100 volts and of $10^{-7}$ seconds duration. The staircase voltage 22 is shifted to a higher voltage level for each sequential signal waveform. When the voltage level of slowly rising ramp voltage 21 or of staircase voltage 22 and ramp voltage 20 are equal, the sampling or interrogation times $T_1$, $T_2$, $T_3$ and $T_4$ are established. As the direct voltage level of slowly rising ramp voltage 21 or of staircase voltage 22 is related to the distances $X_1$, $X_2$, $X_3$ and $X_4$ along the sequential signal waveforms, as displayed on the cathode ray tube, at which their sample pulse heights are taken, by making the cathode ray tube X-deflection voltage proportional to the respective staircase voltage and the Y-deflection voltage proportional to the respective sample pulse height, a sweep speed of X/T is established. The sampling sequence is automatically recycled by turning both the X-deflection potential and the staircase potential to a lower preset value after a predetermined number of sample pulse heights from acceptable input signal waveforms have been displayed on the cathode ray tube.

Figure 4:
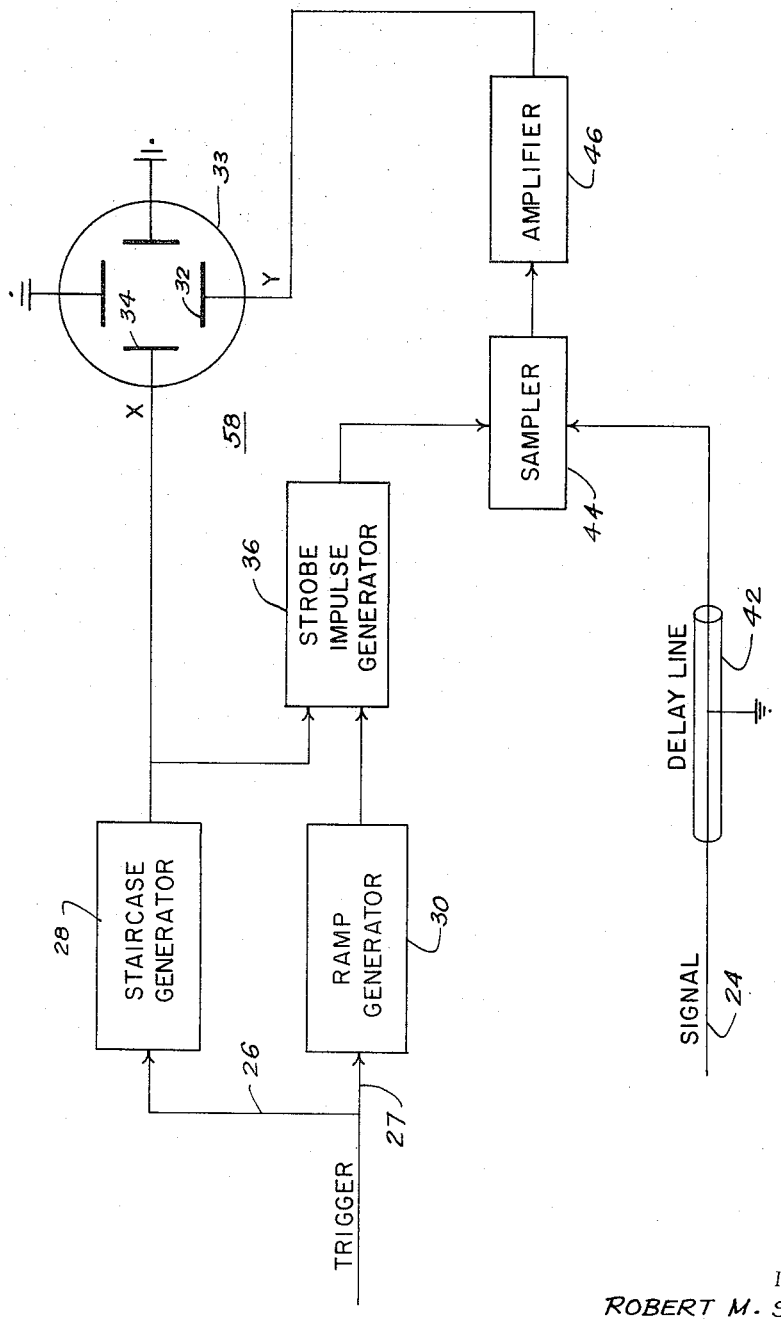
Figure 4 is a simplified block diagram of the sampling oscilloscope.

The general logic of circuitry for the sampling oscilloscope of this invention is shown in Figure 4 as a simplified block diagram. A signal waveform voltage to be sampled is introduced on conductor 24. A trigger voltage related, as to be later more particularly described, to the signal waveform 60 is introduced on conductors 26 and 27 to staircase generator 28 and to ramp generator 30, respectively, which produce voltages as shown in Figure 3. Staircase generator 28 produces either slowly rising ramp voltage 21 or staircase voltage 22. As will be later seen, the circuit is arranged so that a voltage proportional to the height of the sample pulse height is applied to the Y-deflection plate 32 of cathode ray tube 33, while simultaneously a voltage proportional to the direct voltage level of the staircase voltage produced by the staircase generator 28 is applied to the X-deflection plate 34 thereof. Staircase generator 28 and ramp generator 30 are connected to deliver their voltages to strobe or gate impulse generator 36. Strobe impulse generator 36 produces an impulse 118 (Figure 5) at each particular instant $T_1$, $T_2$, etc. that staircase 22 is at the same voltage level as ramp 20. Pulse 118 causes, as understood in the art, diode 50 in sampler 44 to become conductive thereby permitting at that point waveform 60 to be passed therethrough after it has been delayed in delay line 42 for a purpose to be later described. Hence, in effect, pulse 60 is sampled at that point. The sample pulse height is amplified in amplifier 46 and a voltage proportional to it is applied to the Y-deflection plate 32 of cathode ray tube 33.

Figure 5:
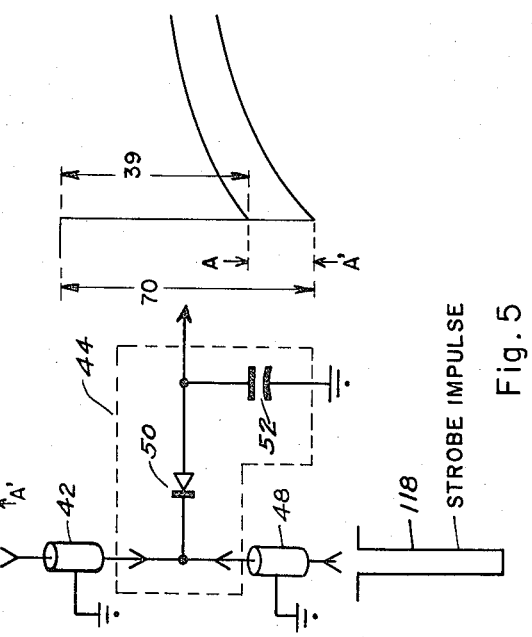
Figure 5 illustrates the details of the sampling circuit which takes a sample pulse height of an input signal waveform by the gating of a microwave diode by a strobe impulse.

The operation of sampler 44 will be better understood through consideration of Figure 5. The strobe impulse 118 from strobe impulse generator 36 is applied to delay line 48 for a purpose to be later described and gates on microwave semi-conductor diode 50 so that a pulse height AA' of signal 60 is stored in condenser 52 as sample pulse height 70, the sum of pulse height AA' and the strobe pedestal 39.

Figure 6:
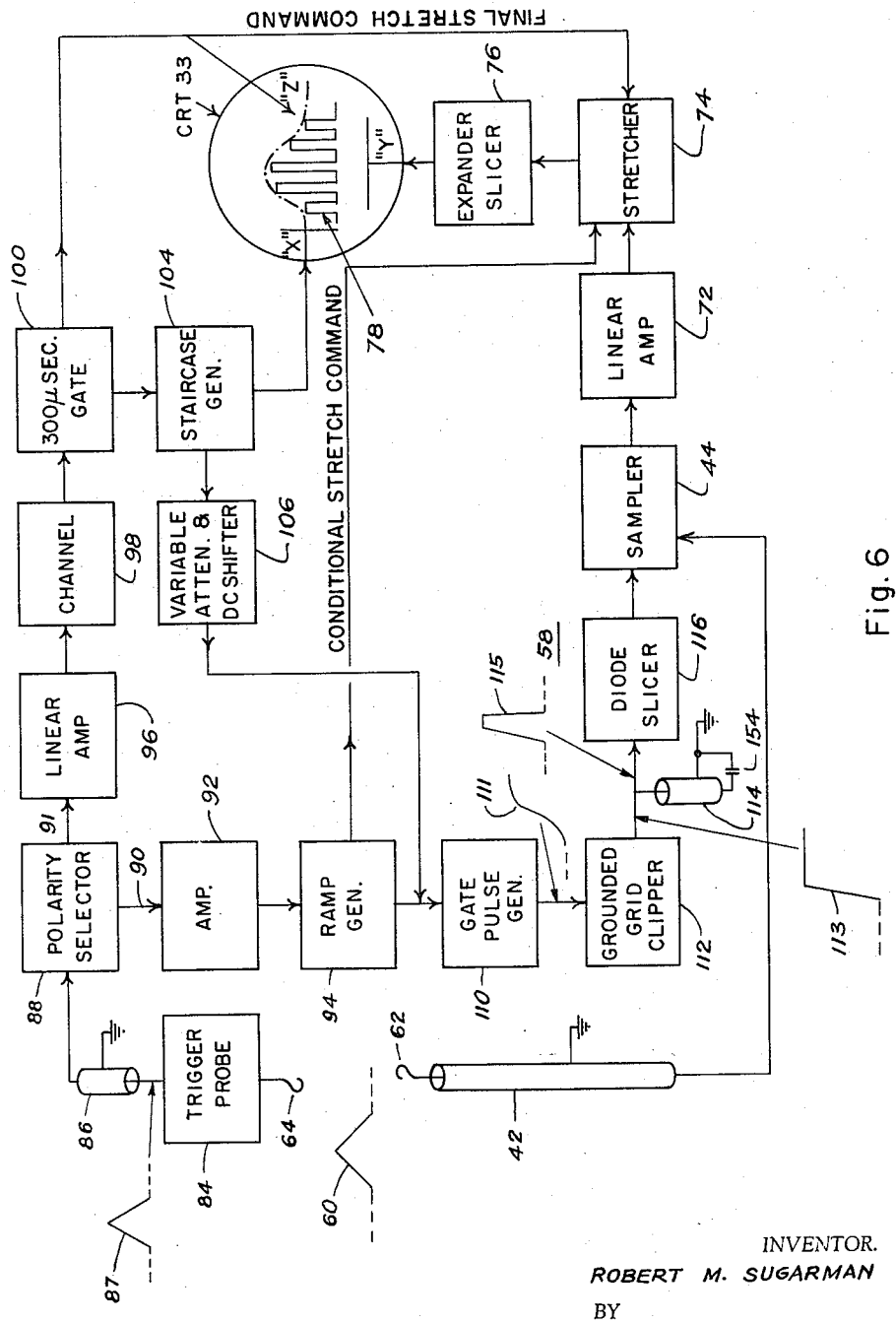
Figure 6 is a more detailed block diagram of the sampling oscilloscope shown in simplified manner in Figure 4 and illustrating certain illustrative pulse shapes.
Figure 7:
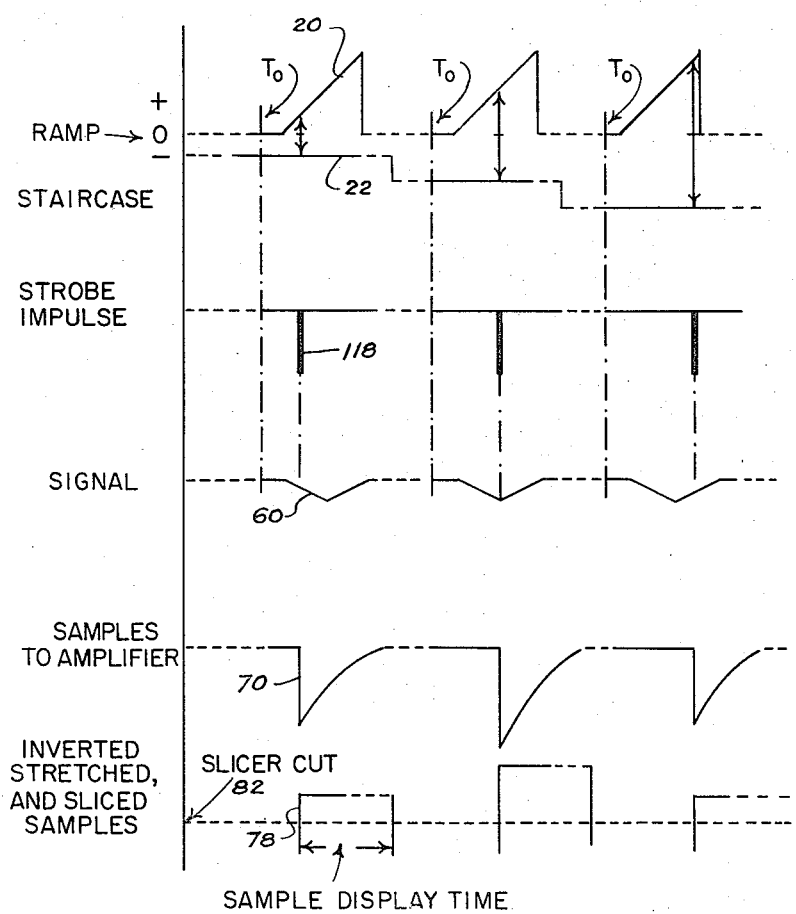
Figure 7 illustrates the relative relationship among various voltages in the sampling oscilloscope of Figure 6.

Referring to the complete block diagram Figure 6 of the sampling oscilloscope 58, and to Figure 7, showing various voltages therein, for a more detailed description, an input signal waveform 60 which is one of a train of signal input waveforms is introduced into the oscilloscope 58 at delay line terminal 62 and trigger probe terminal 64 simultaneously to provide self-triggering of the oscilloscope. Trigger probe terminal 64 may be connected to some other source of trigger impulses in accurate time synchronization with the start of the signal waveform. 60. A trigger impulse produced in this way should have an amplitude proportional to the amplitude of the respective signal waveform.

Signal waveform 60 passes via delay line 42 into pulse height sampler 44 which produces a sample pulse height voltage 70 (Figure 7) linearly related to the instantaneous input signal waveform 60 voltage amplitude at the time of sampling. The pulse height voltage 70 is amplified by a conventional linear amplifier 72 and stretched in time by a conventional stretcher 74. Thereafter, it is inverted and sliced at slicer cut 82 (Figure 7) in a conventional expander slicer 76 and displayed as a vertical deflection 78 on the "Y" axis of cathode ray tube 33. The expander slicer 76 has two functions. First, it removes the pedestal 39 (Figure 5) introduced into the sample pulse height 70 in sampler 44 by strobe impulse 118 (Figure 5) by making the slicer cut 82 thereby passing to the "Y" axis of cathode ray tube 33 only those voltages above a prefixed value. Second, it provides a variable amplification for the input signal waveforms 60 to give an adjustable vertical gain control for the display on cathode ray tube 80.

Returning to the sampling circuitry, trigger probe 84 is a conventional high impedance device such as a low capacity resistor voltage divider or cathode follower circuit which does not load down the input signal waveform 60. Trigger probe 84 is actuated by the leading edge of the input signal waveform 60 and produces a trigger voltage 87 proportional to the former's amplitude. It is important to obtain a trigger voltage 87 without introducing an impedance to distort the signal. Trigger voltage 87 passes from trigger probe 84 via delay line 86 to a conventional polarity selector 88. Delay line 86 provides a convenient flexible extension of the trigger probe 84 from the remainder of oscilloscope 58. The function of polarity selector 88 is to invert if necessary the trigger voltage 87 and make it of the correct polarity to actuate subsequent circuitry. Trigger voltage 87 passes from polarity selector 88 in two directions along both conductors 90 and 91 and is respectively amplified in amplifier 92 to be thereafter transmitted to ramp generator 94 as well as amplified in linear amplifier 96 and thereafter transmitted to channel circuit 98. Amplifier 92 has a sufficiently small rise time so that no significant amount of information about the starting time of input signal waveform 60 is lost. It is particularly useful when the amplitude of the input signal waveform 60 is less than 1 volt. For greater amplitudes thereof, it is generally not necessary.

The function of linear amplifier 96 is to amplify trigger voltage 87 if it is of insufficient amplitude to actuate channel circuit 98. This will generally be the case if the trigger voltage is less than 10 volts. Channel circuit 98 is a pulse height analyzer which selects for display on cathode ray tube 33 only those sample pulse heights of the signal waveforms 60 whose amplitudes fall within a predetermined voltage interval. The accepted trigger voltage 87 which is passed by the channel circuit 98 actuates a 300 μsec. gate 100 which sets the duration of display of voltage 78 on cathode ray tube 33. Illustratively, this is a 300 microsecond sample display time. The 300 μsec. gate 100 also advances the voltage level of the staircase voltage 22 produced by staircase generator 104 for each acceptable trigger pulse 87 passed by channel circuit 98.

It is desirable to extend the duration of display "Z" of pulse height 78 as long as possible to increase its brilliance on the screen of cathode ray tube 33. Stretcher 74 automatically maintains voltage 78 for the duration of 300 μsec. gate 100, thus extending the duration of display "Z" for that time interval.

Ramp generator 94 provides a conditional stretch command for stretcher 74. As there will be a conditional stretch command for every input signal waveform 60 and the only one thereof which is to be stretched by stretcher 74 is one which is passed by channel circuit 98, it is the 300 μsec. gate 100 which, having been actuated by a trigger voltage 87 after it has passed through the channel 98, gives the final stretch command to stretcher 74. The 300 μsec. gate 100 advances the level of staircase voltage 22 (Figure 7) produced by staircase voltage generator 104 a step only when an input signal wavefrom 60 signal falls within the acceptable predetermined amplitude distribution set by channel 98. The distribution is one which will provide an intelligible display of information concerning the average waveform of signal waveform 60 on cathode ray tube 33. Staircase generator 104 is connected both to the "X" deflection of cathode ray tube 33 and to conventional variable attenuator and D.C. shifter 106.

The variable attenuator and D.C. shifter 106 has a two-fold function. The variable attenuator portion of variable attenuator and D.C. shifter 106 adjustably increases or reduces the height of each voltage step in the staircase voltage 22 or of the slope of slowly rising ramp voltage 21. Since the sweep velocity X of the electron beam of cathode ray tube 33 is the horizontal displacement per unit shift in sampling time of the input waveform 60, attenuation or reduction in the height of the steps of the staircase voltage 22 will increase the sweep speed. Since the sampling oscilloscope 58 in practice is used for the observation of signal input waveforms 60 having time durations differing by several orders of magnitude, it is desirable to be able adjustably to alter the sweep speed with which they are viewed.

Each complete traverse of the electron beam across the horizontal axis of the cathode ray tube 33 represents an advance of a total increment of waveform time from the start thereof. The D.C. shifter portion of variable attenuator and D.C. shifter 106 advances or retards this increment of time relative to the start of the waveform by advancing or delaying the time at which the direct voltage level of each step of staircase voltage 22 is changed or at which slowly rising ramp voltage 21 is generated. The function of this variable sweep speed and time delay provided by variable attenuator and D.C. shifter 106 is equivalent to the function of the sweep magnifier of a conventional oscilloscope which provides variable sweep speed magnification and time delay for viewing selected time interval portions of the particular waveform being displayed.

The ramp voltage 20 (Figure 7) from ramp generator 94 and the staircase voltage 22 (Figure 7) from variable attenuator and D.C. shifter 106 enter a conventional gate pulse generator 110. Gate pulse generator 110 provides a gate pulse 111 having a slow initial rise and a steep slope thereafter. (An illustrative gate pulse 111 would rise 20 volts in $3 \times 10^{-9}$ sec., and a remaining 100 volts in $3 \times 10^{-9}$ sec.) The grounded grid clipper 112 produces a sharp step voltage 113 which is converted into a narrow rectangular impulse 115 by shorted delay line 116. The diode slicer 114 accepts only the narrow top portion of the narrow rectangular impulse to provide strobe impulse 118 (Figure 7) for sampler 44.

Figure 8:
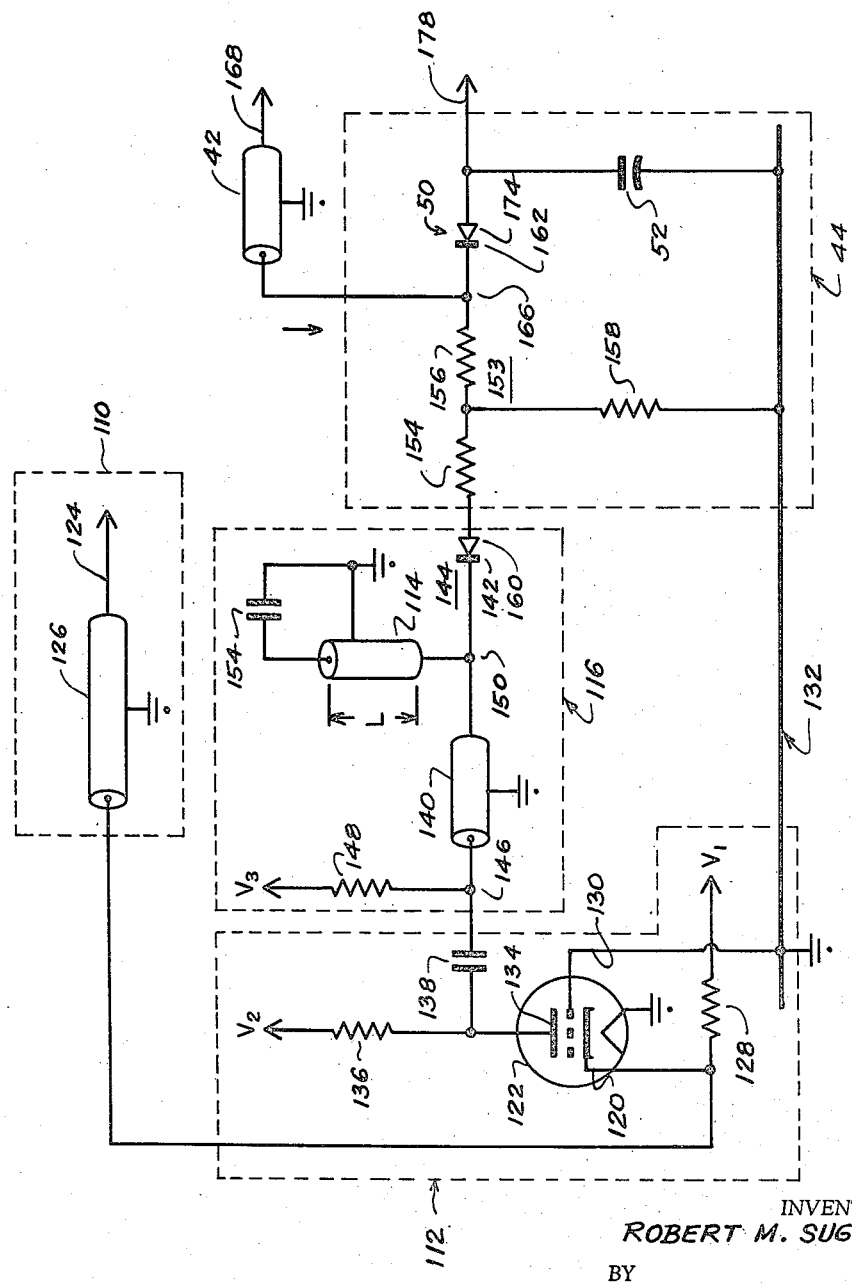
Figure 8 is a detailed circuit diagram for the grounded grid clipper, diode slicer and sampler schematically shown in Figure 6.

The nature and function of grounded grid clipper 112, delay line 114 and diode slicer 116 will be understood by reference to Figure 8. Gate pulse generator 110 is connected to the cathode 120 of ultra-high frequency triode 122 via conductor 124 and grounded delay line 126. The delay line 126 electrically isolates triode 122 from gate pulse generator 110. Cathode 120 is biased positive by cathode voltage supply $V_1$ connected to it via resistor 128. Grid 130 of triode 122 is connected directly to ground 132, and the plate 134 thereof is connected to positive plate voltage supply $V_2$ via resistor 136. The gate pulse 111 from gate pulse generator 110 has a slowly rising toe and the positive bias $V_1$ on cathode 120 prevents tube 122 from passing the toe. The plate 134 of tube 122 saturates soon after cathode 120 conduction (illustratively, about $10^{-9}$ sec. afterward) to provide step voltage 113 which has a steeply rising front (illustratively of $10^{-9}$ sec. duration) for capacitor 138 and then continues at a constant amplitude for the duration of the gate pulse 111 on cathode 120. Capacitor 138 is connected via grounded delay line 140 to the cathode 142 of microwave crystal diode 144, preferably a silicon diode. Delay line 140 serves to isolate electrically the capacity of anode 134 from diode 144. The junction 146 of capacitor 138 and delay line 140 is connected via resistor 148 to positive voltage supply $V_3$. Resistor 148 is chosen to have a resistance equal to the characteristic impedance of delay line 140 so as to prevent multiple reflections of strobe impulse 115 therein. Voltage supply $V_3$ positively biases cathode 142 of diode 144 which has a relatively high back impedance at a relatively high back inverse voltage. The juncture 150 between delay line 140 and cathode 142 of diode 144 is connected to grounded delay line of length L shorted through large capacitor 154. A shorted delay line has the property of reflecting at its terminal end a voltage introduced at its input end. The step voltage 113 from triode 122 passed via capacitor 138 to delay line 114 is transformed into a sharp pulse 115 at juncture 150 (illustratively $10^{-9}$ sec. full width at half maximum) which then has its bottom portion cut off by diode 144. Diode 144 passes only that portion of the pulse 115 at juncture 150 which is greater than the bias voltage $V_3$ as strobe impulse 118. Illustratively, strobe impulse 118 has $3 \times 10^{-10}$ sec. duration at half maximum.

A T attenuator 153 comprises resistors 154, 156 and 158 which are arms and leg thereof and is connected between anode 160 of microwave crystal diode 144 and the cathode 162 of microwave crystal diode 50. Microwave crystal diode 50 has a high instantaneous back impedance after it ceases to conduct and is preferably a germanium diode, has a low noise temperature, and has an energy level structure such that it will maintain a high impedance until at least some few tenths of a volt are applied across it in the direction of conduction. An input signal wave-form 60 (Figure 6) is introduced to juncture 166 between attenuator 153 and diode 50 via conductor 168 and delay line 42.

The anode 174 of diode 50 is connected to ground 132 via capacitor 52 and also via conductor 178 to linear amplifier 72 (Figure 6). Diode 50 normally presents a high impedance to juncture 166 even in the presence of signal waveforms of any polarity provided they are less than a small voltage (illustratively 60 millivolts) until it is strobed by strobe impulse 118 causing it to conduct and produce sample pulse height 70. The voltage representative of the sample pulse height 70 is stored in capacitor 52. A capacitor 52 is used whose capacity is chosen as result of a compromise between two desirable design characteristics of linear amplifier 72. The larger the capacity (for a given value of diode 50 dynamic back impedance), the longer will be the duration of sample pulse height 70 at the input of amplifier 46 and the required band-pass thereof is less. However, the smaller the capacity, the larger is the amplitude of sample pulse height 70 at the input of linear amplifier 72 and the required gain thereof is less and the effect of any noise introduced by amplifier 46 into sample pulse height 70 is smaller. Hence, the signal to noise ratio of the display on cathode ray tube 33 will be better.

This sampling oscilloscope contains four elements which determine the fidelity of waveform reproduction. Channel circuit 98 (Figure 6) greatly reduces any amplitude dispersion (and resultant time dispersion) that would normally be present in the display of information concerning input signal waveforms with random amplitudes.

The other three elements are selected so as to limit the distortion when information is displayed on cathode ray tube 33 concerning input signal waveforms with identical amplitudes. The nature of this distortion will be understood through the following discussion. If a test signal consisting of an idealized step function of zero rise time is viewed with any oscilloscope, the resulting pattern will show a finite rise time and some amount of oscillatory over-and-under shoot about the final value of the step height. The idealized step function may be analyzed into an infinitely wide band of frequencies with a specific phase relationship between each frequency. An oscilloscope system cannot treat all input frequencies with the same gain, nor can it avoid introducing an additional phase shift that varies with frequency. The resultant gain-phase distortion causes the aforesaid loss of rise time and introduces the oscillatory distortion.

There are gain-phase distortion limiting elements in this sampling oscilloscope:

(1) The signal delay line 42 allows the sampling oscilloscope 58 to be triggered by the input signal waveform 60. This is done by making the delay time of delay line 42 from the signal input terminal 62 to the sampler 44, which takes the pulse height samples, at least equal to the time delay involved from receipt of a trigger impulse at the trigger probe terminal 64 to the delivery of a strobe impulse 118 to the sampler 44. Thus, all portions of the signal waveform may be sampled. The delay line 42 introduces a loss in the rise time of the signal input waveform 60 proportional to the square of its length. The required volume of cable for a given rise time goes as the third power of the required delay. The required delay is minimized in this oscilloscope 58 by using conventional techniques for minimizing the time delay between the input trigger pulse and the earliest possible strobe pulse. The delay line 42 serves an additional function. Since the sampling diode 50 (Figure 8) is effectively inserted directly across the delay line 42 to give maximum useful sensitivity, strobe impulses 118 from diode 144 appear across the diode 50 and may, under some operating conditions, interact with the source of signal waveforms at conductor 168. Such interaction cannot occur until at least twice the delay time of line 42, which is usually longer than the duration of any waveform of interest.

(2) The width of a strobe impulse is determined in part by diode 144. The rise time of the oscilloscope 58 cannot be less than the strobe impulse width or sampling time. Therefore, every effort is made to use a diode 144 with a fast switching time.

(3) The diode 50 presents a first reactive impedance, even though it is not conducting, at juncture 166 to the signal on the delay line 42. The circuitry to the left of juncture 166 also presents a second partly reactive impedance to the signal thereat. These two impedances when combined are preferably as perfectly matched as possible to the signal delay line impedance over the widest possible frequency range to minimize signal gain-phase distortion. A sampling diode 50 is selected which can change its impedance as rapidly as possible when gated so as not to tend to lengthen the time of signal sampling or equivalently the rise time of the oscilloscope.

A constant impedance housing has been found to be important for mounting the delay line 114, diodes 144 and 50 and the circuit elements shown in Figure 8 to the right of juncture 146 so as to obtain minimum stray inductance and capacity and thereby producing the shortest width possible for strobe impulse 118. It is also used to prevent an impedance mismatch to the input signal input line 168.

Figure 9:
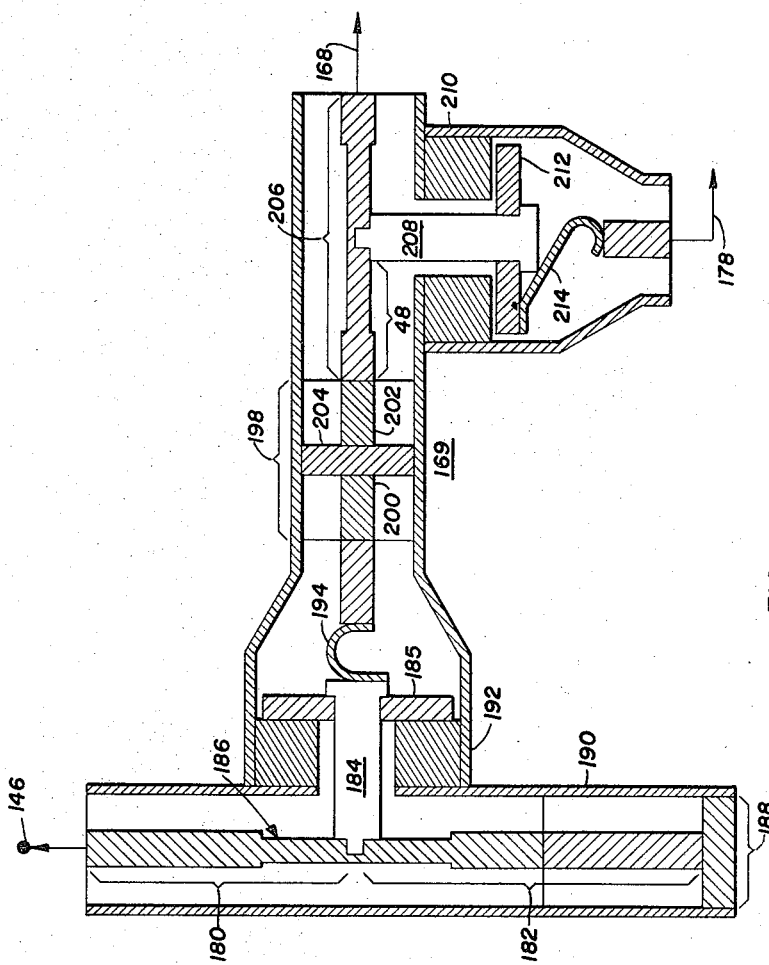
Figure 9 illustrates a coaxial mounting in which are mounted certain ultra-high frequency components shown in Figure 8.

A coaxial mounting 169 having a constant impedance is shown in Figure 9. It illustratively has 50 ohms characteristic impedance. The delay line 180 corresponds to delay line 140, and delay line 182 corresponds to delay line 114. Actually, delay lines 180 and 182 are parts of the same coaxial line, the junction point between them being connected to diode 184 which corresponds to diode 144. Diode 184 is supported by insulator 185. To compensate for the capacity of diode 184, the inner conductor of delay lines 180 and 182 is slightly undercut in the region of diode 184. The capacitor 188 (corresponding to capacitor 154) must have a low inductance to short effectively the delay line 182. Illustratively, this is a conventional button capacitor with its rim soldered to the outer conductor 190 of delay line 182. The conducting housing 192 serves to form the outer conductor for coaxial transmission through diode 184. Low inductance spring 194 holds diode 184 in place and forms the center conductor from diode 184 to an attenuator 198 (illustratively, 10 db) having components 200, 202 and 204 corresponding to resistors 154, 156 and 158, respectively. The purpose of attenuator 198 is to provide a correct termination to signal delay line 206 corresponding to delay line 42. Attenuator 198 should provide the best possible impedance match to delay line 206. Actually, a slight resistive mismatch, if constant with frequency, is permissible as this will produce a change in amplitudes of the signal waveform but no distortion of its waveform. Reflections from a resistive mismatch will not appear on the signal waveform until twice the delay time of the delay line 206. Techniques for the best fabrication of attenuator 198 are well known. Delay line section 48 is the extension of delay line 206 which joins it to component 202 of attenuator 198. The center conductor of delay line 206 is undercut to compensate for the capacity of diode 208 which corresponds to diode 50. Conductive housing 210 serves as the outer conductor for transmission of the sample pulse height and the pedestal through diode 208. Conductive washer 212 together with conductive housing 210 form capacity 52 of Figure 8. It is essential to form capacity 52 as physically close as possible to diode 208. Otherwise the strobe impulse may make multiple passes through diode 208 thereby producing a distorted display on the cathode ray tube. Low inductance spring 214 holds diode 208 in place and is electrically connected to conductor 178.

An illustrative performance of the sampling oscilloscope in accordance with this invention is as follows:

(1) Frequency response over the range 0 to 1200 megacycles is constant within 3 decibels variation.

(2) Observed rise time for a sampling oscilloscope test signal step function from 10% to 90% of its final amplitude is $3.8 \times 10^{-10}$ seconds. This includes rise time of the step function. The rise time for an idealized signal step function would probably be substantially lower. There is less than 2% oscillatory ringing or overshoot in this response.

(3) Sensitivity is typically 15 millivolts per inch deflection at the cathode ray tube for a signal to noise ratio of sixty to one.

Except as aforesaid, there are no limitations on the practice of this invention. Other variations in size, proportions, specific component values and other details may be made without departing from the scope and spirit of this invention as set forth in the following claims.

What is claimed is:

1. A sampling oscilloscope means for presenting a display of information concerning waveforms comprising in combination: a cathode ray tube having a luminescent screen and a first and a second electron beam orthogonal axis deflection system for presenting said display; an input signal waveform terminal to receive electrical waveforms to be displayed; a trigger probe to receive said waveforms to produce trigger pulses synchronized with a respective input signal waveform and having an amplitude proportional thereto; a ramp voltage generator connected to said trigger probe being actuated by a trigger pulse to provide a ramp voltage for establishing a time scale for each said waveform, the height of said ramp voltage at any time being proportional to a time interval measured from the start of the respective waveform; a strobe impulse generator connected to said ramp voltage generator; a variable voltage shifter to provide a variable voltage, said variable voltage shifter being connected to said first electron beam deflection system and said strobe impulse generator, said strobe impulse generator providing a strobe impulse when said variable voltage and said ramp voltage intersect at the same voltage level; a delay line; a pulse height sampler connected to said input signal waveform terminal via said delay line, said sampler also being connected to said second electron beam deflection system of said cathode ray tube, said sampler providing a sample pulse height of each sequential waveform passed thereto by said delay line simultaneously with the arrival thereat of a strobe impulse from said strobe impulse generator, whereby there is presented on said cathode ray tube luminescent screen a pattern representative of intelligible information concerning an average waveform related to said waveforms.

2. An oscilloscope means for presenting an intelligible display of information concerning electrical waveforms comprising in combination: a cathode ray tube having a vertical axis electron beam deflection system and a horizontal axis electron beam deflection system and a luminescent screen for presenting said display; an input signal waveform terminal to receive electrical waveforms in a train thereof; a trigger probe to receive said waveforms and produce trigger pulses synchronized with a respective input signal waveform and having an amplitude proportional thereto; a ramp voltage generator actuated by said trigger pulses to provide a ramp voltage whose value at any instant is proportional to a time interval measured from the start of a waveform; a pulse height analyzer connected to said trigger probe for passing only those trigger pulses related to waveforms which fall within a predetermined amplitude distribution and connected to said vertical deflection axis to permit display only of information concerning said waveforms; a variable voltage generator to provide a variable voltage; a strobe impulse generator connected to said variable voltage generator and said ramp generator to provide a strobe impulse; said variable voltage and said ramp voltage when at the same voltage level causing said strobe impulse generator to initiate said strobe impulse, said variable voltage generator also being connected to said electron beam horizontal axis deflection system for providing horizontal sweep on said cathode ray tube; a delay line; a waveform pulse height sampler connected to said input signal waveform terminal via said delay line to provide a sample pulse height from each sequential waveform passed thereto by said delay line simultaneously with the arrival thereat of a strobe impulse from said strobe impulse generator, said sampler being connected to said vertical axis electron beam deflection system to pass thereto said pulse heights, whereby there is presented on said cathode ray tube luminescent screen a pattern which is representative of intelligible information concerning waveforms passed by said pulse height analyzer.

3. An oscilloscope means for presenting a display of information concerning waveforms comprising in combination: an input signal waveform terminal to receive electrical waveforms in a train thereof; a cathode ray tube for presenting said display having a luminescent screen and an electron beam vertical axis deflection system and an electron beam horizontal axis deflection system; a trigger probe to receive said waveforms to produce trigger pulses synchronized with a respective input signal waveform and having an amplitude proportional thereto; said trigger probe being connected to a polarity selector, said trigger probe being a high impedance device which does not load down said signal waveforms, said polarity selector inverting said trigger pulse, if necessary, to make it of correct polarity to actuate subsequent circuitry; said trigger pulses passed by said polarity selector actuating a pulse height analyzer connected to said polarity selector which passes trigger pulses related to waveforms which fall within a predetermined amplitude distribution; said pulse height analyzer connected to and actuating a display time gate; said polarity selector being also connected to a ramp voltage generator; said ramp voltage generator providing a ramp voltage for establishing a time scale for each waveform admitted to said signal input terminal; a variable voltage shifter connected to and actuated by said display time gate; said variable voltage shifter being connected to said horizontal axis deflection system to provide horizontal sweep for said cathode ray tube; said variable voltage being connected via a variable attenuator and voltage shifter to a gate pulse generator; said gate pulse generator being connected to said ramp generator providing a gate voltage when said ramp voltage and said variable voltage are at the same voltage level, said gate voltage having a slow rising toe and a fast rise thereafter; a grounded grid clipper connected to said gate voltage generator for providing a step voltage from said gate voltage; a shorted delay line connected to said grounded grid clipper for providing a narrow voltage pulse from said grounded grid clipper step voltage; a diode slicer connected to said ground grid clipper to receive said narrow voltage pulse and cut off its bottom portion; a sampler connected both to said diode slicer and to said signal input terminal via a delay line, said sampler providing a sample pulse height of waveforms which arrive simultaneously thereafter with respective strobe impulses from said diode slicer, said sample pulse height having a signal waveform component and a strobe impulse pedestal component; said sampler being connected to a stretcher providing said sample pulse heights thereto; said stretcher being connected to and conditionally activated by said ramp generator and being connected to and finally actuated by said display time gate; said stretcher stretching in time said pulse height from said sampler; an expander-slicer connected to said stretcher for adjustably altering said display pulse heights and for removing said strobe impulse pedestal therefrom; said expander-slicer being connected to said electron beam vertical axis deflection system of said cathode ray tube whereby said cathode ray tube luminescent screen presents a pattern of intelligible information concerning said waveforms so sampled.

4. In a sampling oscilloscope having an input signal waveform terminal for receiving waveforms in a train thereof and a trigger probe for providing trigger pulses synchronized in time with respective said input waveforms and having amplitudes respectively proportional thereto; a grounded grid clipper; a diode slicer and a diode gate; said grounded grid clipper being connected to said trigger probe and providing a step function voltage from a gate voltage admitted to its cathode, said grounded grid clipper not conducting until after the slowly rising toe of said gate voltage has passed while thereafter the plate thereof saturates for the period of the remaining rise time of said gate voltage to provide a step voltage; a diode slicer diode connected to said grounded grid clipper via a shorted delay line, said diode slicer being a microwave crystal diode having a high impedance at a relatively high back inverse voltage; said shorted delay line passing to said diode slicer a narrow voltage pulse; said diode slicer passing only the top portion thereof as a strobe impulse; a waveform strobing diode in said diode gate; said strobing diode being a microwave crystal diode having a high instantaneous back impedance after it ceases to conduct; an impedance matching attenuator connected to and following said diode slicer and also connected to said strobing diode; said strobing diode being connected to said signal input terminal via a delay line receiving simultaneously said strobe impulse from said attenuator and said waveform from said signal delay line to provide a sample pulse height of said waveform at successive time intervals from the start thereof for each sequential respective waveform; and a capacitor connected to said diode gate for storing said sample pulse heights.

5. In a sampling oscilloscope for presenting a display of information concerning transient signal waveforms having random time spacings and random amplitudes admitted thereto, a pulse height analyzer for establishing the display of only waveforms having amplitudes which fall within a predetermined distribution thereof, sample pulse height establishing means connected to said pulse height analyzer including a strobe impulse generator for providing a strobe impulse at successive intervals from the start of each sequential waveform to be sampled, a sampler connected to said strobe impulse generator, a delay line connected to said sampler for delivering said waveforms thereto simultaneously with the arrival thereat of said strobe impulses, a cathode ray tube connected to said sampler for receiving said sample pulse heights whereby there is obtained a display thereon of an average waveform representative of said sampled waveforms.

6. A sampling oscilloscope for study of transient waveforms comprising, in combination, first means receiving said waveforms for sampling the amplitudes of similar repetitive waveforms at one point at a time, second means connected thereto also receiving said waveforms for delaying the sampling time with respect to the start of the respective waveform in small increments, third means connected to said first means for stretching in time said amplitudes, fourth means connected thereto for displaying said samples on an included indicator whose horizontal deflection is linearly related to said sample time delay, said first means for sampling including fifth means for producing a gating pulse, sixth means connected thereto for shaping said gating pulse having a first microwave diode and seventh means connected to said sixth means for taking said sample amplitudes having a second microwave diode gated by said gating pulse and a pulse height analyzer connected between said first means and said fourth means to select for display on said fourth means waveforms having amplitudes which fall within a predetermined amplitude distribution and between said first means and said third means to activate said latter means.

7. A self-triggering sampling oscilloscope for presenting a record of the average waveform of a plurality of input signal waveforms in a train of waveforms admitted thereto comprising, in combination, first means for strobing said plurality of input signal waveforms at a sequential time interval from the start of respective successive waveforms thereof to obtain a sample pulse height therefrom, second means connected thereto for displaying said pulse heights on an included indicator whose vertical deflection is proportional to said pulse height and whose horizontal deflection is proportional to said respective time interval.

8. A self-triggering sampling oscilloscope for presenting a record of the average waveform of a plurality of input signal waveforms in a train of waveforms admitted thereto comprising, in combination, first means for selecting from said train those waveforms having amplitudes which fall within a predetermined amplitude distribution, second means connected thereto for obtaining a sample pulse height of each successive waveform so selected at a successive time interval from the start of each respective sequential waveform and third means connected thereto for presenting said sample pulse heights on an included indicator whose horizontal sweep velocity equals the ratio of its horizontal axis interval to said respective time interval whereby there is obtained a record of the average waveform of said sampled waveforms.

9. A sampling oscilloscope for presenting a display of information concerning the average waveform of a plurality of waveforms in a train of waveforms admitted thereto comprising, in combination, first means for internally self-triggering said oscilloscope to produce a strobe impulse for each member of said plurality of waveforms, second means connected thereto for delaying each member of said plurality of waveforms for a time interval, third means connected to said first means and said second means for obtaining a sample pulse height when strobed by said strobe impulse of each sequential member of said delayed plurality of waveforms at a respective successive pulse height sampling time and fourth means connected thereto for displaying said pulse heights whereby there is obtained a representation of the average waveform of said plurality of waveforms.

10. A sampling oscilloscope for presenting a display of information concerning waveforms in a train of waveforms admitted thereto comprising, in combination, first means for selecting from said train of waveforms a plurality of waveforms whose amplitudes fall within a predetermined amplitude distribution, second means connected thereto for triggering said oscilloscope by each member of said plurality of waveforms to produce a strobe impulse for determining a successive pulse height sampling time for each sequential member of said plurality of waveforms, third means connected to said first means for delaying each member of said plurality of waveforms for a predetermined time interval, fourth means connected thereto for strobing each sequential member of said plurality of waveforms after said time interval by said strobe impulse at a respective said successive pulse height sampling time from the start of each said sequential member to provide a sample pulse height thereof and fifth means connected thereto for presenting a display of sample pulse heights whereby there is obtained a representation of the average waveform of said plurality of waveforms.

11. A sampling oscilloscope for presenting an indication of information concerning input signal waveforms in a train of waveforms admitted thereto comprising, in combination: first means for delaying said waveforms for a time interval; second means for generating a strobe impulse at successive times after the start of respective sequential waveforms; third means connected to said first means and said second means for strobing said delayed sequential waveforms to produce a sample pulse height at respective said successive times; fourth means connected to said third means for displaying on an included cathode ray tube the average waveform of waveforms so strobed; said first means including a delay line; said second means including a trigger probe responsive to said waveform to produce a trigger pulse whose amplitude is proportional to the amplitude of said respective input signal waveform and synchronized therewith, a pulse height analyzer connected to said trigger pulse and responsive to said trigger pulse to pass trigger pulses whose amplitudes fall within a predetermined amplitude distribution, a gating circuit connected to said pulse height analyzer responsive to said passed trigger pulses, a variable voltage shifter to produce a variable voltage, a variable attenuator and D.C. shifter connected thereto responsive to said variable voltage shifter, a ramp voltage generator connected to said trigger probe to establish a time scale for each waveform, a gate pulse generator connected to said ramp generator to produce a gate voltage when said ramp generator and said variable voltage being at the same voltage level establish a successive time after the start of each respective sequential waveform, a grounded grid clipper connected to said gate pulse generator responsive to said gate pulse to produce a step voltage, a shorted delay line connected to said grounded grid clipper responsive to said step voltage to produce a narrow rectangular-like voltage, a first microwave diode connected to said shorted delay line having a relatively high impedance at a relatively high back inverse voltage to pass only the top portion of said rectangular-like pulse as said strobe impulse; said third means including a second microwave diode connected to said first diode having a high instantaneous back impedance responsive to said strobe impulse to pass a sample pulse height of said respective sequential waveform at said strobing time, a capacitor connected to said second diode to receive and store said sample pulse height; said fourth means including a stretcher connected to said capacitor and said gating circuit to stretch sample pulse heights in time, and a cathode ray tube to display said sample pulse heights, the horizontal deflection system of said tube being connected to and actuated by said variable voltage shifter and the vertical deflection system thereof being connected to said stretcher and being actuated by said stretched sample pulse heights whereby there is presented on said cathode ray tube a display of said sample pulse heights representative of intelligible information concerning said sampled waveforms.

12. A circuit for producing a representative composite of a waveform taken from a train of waveforms varying in amplitude and timing, comprising, in combination, means for receiving said waveforms and triggering a pulse at the beginning of each said waveform having an amplitude in proportion thereto, first means connected to said triggering means for producing a series of uniformly increasing voltages initiated by said triggers, second means connected to said triggering means for producing a uniformly increasing voltage and for eliminating display of waveforms deviating by a non-representative amount from a predetermined range of amplitudes, strobe generator means connected to receive the output voltages from said first and second means producing a sharp gating pulse at each instant that said output voltages are equal in amplitude whereby a sharp gating pulse is produced at a different point in time for each succeeding incoming waveform, means for receiving and delaying for a finite interval in time said incoming waveforms, sampler means connected to the latter said means and said strobe generator means for producing a pulse at the instant of each said gating impulse having an amplitude of a particular waveform at that instant from said receiving and delaying means, and means connected to said second means and said sampler means for reconstructing a composite waveform representative of said incoming waveforms based upon a time sweep established by said second means.

References Cited in the file of this patent

UNITED STATES PATENTS

| | | |
|---|---|---|
| 2,368,448 | Cook | Jan. 30, 1945 |
| 2,368,449 | Cook | Jan. 30, 1945 |
| 2,841,719 | Radcliffe | July 1, 1958 |
| 2,853,630 | Lane et al. | Sept. 23, 1958 |